Jan. 1, 1929.

B. JIROTKA 1,697,655

MEANS FOR PRODUCING COLORED LIGHT EFFECTS

Filed July 7, 1926

Inventor:
Bohumil Jirotka
By
Atty.

Patented Jan. 1, 1929.

1,697,655

UNITED STATES PATENT OFFICE.

BOHUMIL JIROTKA, OF BERLIN, GERMANY, ASSIGNOR TO THE FIRM DR. OTTO SPRENGER, PATENTVERWERTUNG JIROTKA M. B. H., OF VADUZ, LIECHTENSTEIN.

MEANS FOR PRODUCING COLORED-LIGHT EFFECTS.

Application filed July 7, 1926, Serial No. 121,062, and in Germany August 12, 1925.

My invention relates to means for producing vari-colored light effects for signalling, advertising and cinematographic purposes as well as for use in connection with illuminated fountains and other purposes.

According to the present invention rays of colored light are brought into the beam of white light emitted from a source of light, e. g. a search light. To this end preferably a plurality of iridescent faces are arranged in such relation to one or more sources of light, that partly colored light is reflected. The arrangement may be such that the color of the light rays or of the illuminated object changes in accordance with the position of the spectator or upon the relative positions of the source of light and the reflecting faces being altered.

Figure 1:
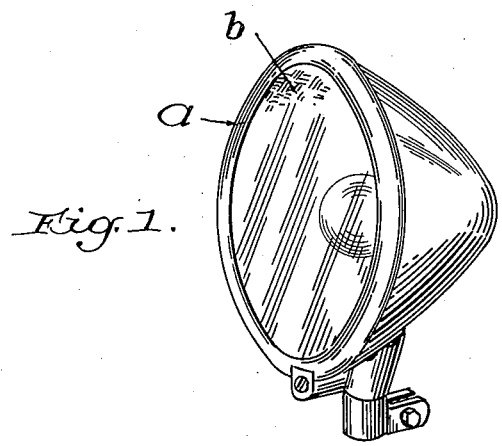
Figure 2:
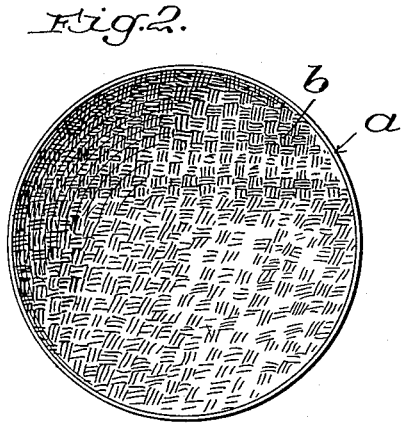
Figure 3:
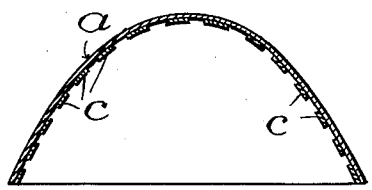
Figure 4:
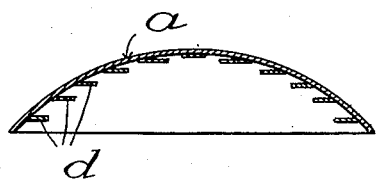

On the appended drawing, on which I have illustrated my invention by way of example, Fig. 1 is a perspective view of a light reflector, Fig. 2 a front view thereof and Fig. 3 a transverse section, while Fig. 4 is a similar view as Fig. 3 showing a modified reflector.

The desired light effects of the reflector $a$ may be obtained by employing iridescent bodies as reflectors. Preferably the different reflecting surfaces $b$, $c$ and $d$ (Figs. 1, 2, 3 and 4 respectively) of reflectors, or hollow mirrors, are treated with chromium, cobalt, silver, copper, or with compositions of such metals. The reflector casing $a$ may be made of any desired suitable material, e. g. metal, preferably aluminum.

In order to obtain a plurality of colors on small reflecting surfaces, the latter may be hammered, or they may be equipped with small shell-like discs $c$, or $d$, or with other projections. The reflecting surface may also be composed of a plurality of facets, arranged adjacent to each other.

The source of light to be employed may be of any known kind, such as incandescent lamps, electric arcs, gas light, incandescent gas light or ordinary candles.

On illuminated fountains the reflector and the source of light are preferably arranged in such a manner, that they are invisible to the spectators, and the rays may be reflected directly upon the jets of water. For illuminating shop windows the light reflexes may be directed at the goods exhibited in the windows, or at a portion of the same.

For signalling purposes the reflectors, or search lights, may be arranged irradiating in a plurality of colors. Such reflectors are especially adapted for use on ships and automobiles in foggy weather, because the colored light reflexes will penetrate the fog better than the white light. This is because the steam or water particles, which form the main part of the fog, are white. The white rays will therefore be absorbed, but the colored rays will pass through and become visible from a point comparatively far away from the source of light. As most of the railway and automobile accidents take place in foggy weather on account of the signals not being observed it is evident, that the invention will be of great importance in this respect.

Under normal conditions the colors do not affect in any undesired way the use of the reflector.

For colored projections of ordinary or colored pictures the reflectors may be directed upon the projecting screen from the front, from behind or from the sides. On the white portions of the screen the reflexes will be absorbed by the white rays of the projection lamp, but in the darker and the darkest portions (which in nature are colored) the reflexes will be colored. In colored pictures which are transparent, such as diapositives, the colors will thus be strengthened.

Each iridescent field may have a special source of light, or a plurality of differently colored fields or discs $c$ may be arranged in angular relation to each other (Fig. 3). Also, the discs $d$ may be disposed as shown in Fig. 4. The discs or fields may be stationary, movable or rotating. The detail arrangement of the devices for practising the new method may, of course, be altered in many respects without the scope of the invention being departed from.

I claim:

Reflector for producing colored light effects comprising iridescent small metallic areas made iridescent through treatment in a metallic bath containing chromium, cobalt, copper, silver and manganese.

In testimony, whereof I affix my signature.

BOHUMIL JIROTKA.